(12) United States Patent
Yoon

(10) Patent No.: US 7,604,902 B2
(45) Date of Patent: Oct. 20, 2009

(54) CAN TYPE LITHIUM ION SECONDARY BATTERY

(75) Inventor: Heui Sang Yoon, Cheonan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 310 days.

(21) Appl. No.: 11/091,402

(22) Filed: Mar. 29, 2005

(65) Prior Publication Data

US 2005/0221175 A1    Oct. 6, 2005

(30) Foreign Application Priority Data

Mar. 30, 2004    (KR) ................ 10-2004-0021424

(51) Int. Cl.
  *H01M 2/02*    (2006.01)
(52) U.S. Cl. .............. 429/336; 429/164; 429/176; 429/175; 429/7
(58) Field of Classification Search ........... 429/336, 429/164, 176, 175, 7
  See application file for complete search history.

(56) References Cited

U.S. PATENT DOCUMENTS 6,084,380 A * 7/2000 Burton .................. 320/107
6,982,642 B1 * 1/2006 Cesana et al. ............ 340/550

FOREIGN PATENT DOCUMENTS

KR    10-2005-0089937    9/2005

* cited by examiner

*Primary Examiner*—Jane Rhee
(74) *Attorney, Agent, or Firm*—H.C. Park & Associates, PLC

(57) ABSTRACT

The claimed invention is directed to an improved secondary battery having a substantially uniform thickness. In one embodiment, a can type lithium on secondary battery is formed to include a structure that enables the battery to have a substantially uniform thickness even when wrapped with a label. Illustratively, the structure may include a label overlap receiving section formed on a portion of either an upper or lower cover of the battery. The label overlap receiving section ensures that a certain portion of a label overlap area is not thicker than a thickness of an area of the label. In this manner, a substantially uniform battery thickness is provided.

17 Claims, 9 Drawing Sheets

CAN TYPE LITHIUM ION SECONDARY BATTERY

CROSS-REFERENCE TO RELATED APPLICATIONS

This application claims priority to Korean Patent Application No.: 10-2004-0021424 filed on Mar. 30, 2004, the contents of which are herein incorporated by reference in their entirety.

BACKGROUND OF THE INVENTION

1. Field of the Invention

The present invention relates to a secondary battery, and more particularly to a can type lithium ion secondary battery having a uniform thickness.

2. Description of the Prior Art

Recently, secondary batteries have actively been studied and developed since they are rechargeable and can be fabricated in smaller sizes with larger capacity. Such secondary batteries include nickel-hydrogen (Ni-MH) batteries, lithium (Li) batteries and lithium ion (Li-ion) batteries.

According to a typical method of fabricating a bare cell of a secondary battery, an electrode assembly including a positive electrode, a negative electrode and a separator is seated in a can generally made from aluminum or an aluminum alloy, the can is subjected to finishing to form a can assembly, an electrolyte is injected into the can, and the can assembly is finally sealed. The can may be usually made from steel. However, a can made from aluminum or an aluminum alloy reduces the weight of an entire battery, due to the small weight of aluminum or an aluminum alloy. Moreover, a can made from aluminum or an aluminum alloy does not corrode even when it is used at high voltages for a long period of time.

As an energy source, batteries may release a great quantity of energy. Especially, secondary batteries not only contain a high density of accumulated energy but also may receive and additionally accumulate energy supplied from another energy source. When an internal short circuit or any other problem occurs in the secondary batteries in such a highly energy-accumulated state or while being recharged, the accumulated energy may be instantly released, thereby causing ignition or explosion of the batteries.

Lithium-based secondary batteries widely used in recent times have a potential fire or explosion hazard because of the high activity of lithium. A lithium ion battery is more stable than a lithium battery because the former use only lithium in ion state ($Li^+$), rather than metallic lithium. However, when the batteries have any internal problems, materials used for a negative electrode or a non-aqueous electrolyte will likely cause significant hazards of fire and explosion due to their combustibility.

Thus, a variety of safety devices are used to prevent the hazards of fire and explosion caused by the internal problems of the batteries being charged or having been charged. Such safety devices are connected to positive and negative terminals of a bare cell by a conductive structure called a "lead plate." The safety devices can prevent dangerous conditions, such as overheat and fire, by breaking the current when a battery is heated up or charged or discharged beyond its safe limits, resulting in rapid increase of voltage. Safety devices that can be connected to a bare cell include a protective circuit module for detecting any abnormal current or voltage to block the flow of current, a PTC (positive temperature coefficient) thermistor for detecting overheat caused by an abnormal current, and a bimetal strip.

Secondary batteries are fabricated by connecting a circuit section including a safety device to a bare cell by means of a molding resin, covering the lower part of the bare cell with a lower cover and labeling the outer surface of the cell.

FIG. 1 is a perspective view showing the assembly of a lower cover into a conventional can type lithium ion secondary battery. FIG. 2a is a bottom view of the can type lithium ion secondary battery in FIG. 1 wrapped with a label. FIG. 2b is a plan view of the can type lithium ion secondary battery in FIG. 1 with a label.

Referring to FIGS. 1 and 2a and 2b, the conventional can type lithium ion secondary battery includes a bare cell 10 and a circuit molding section 12 with a safety means, such as a protective circuit module, filled by resin on top of the bare cell 10. A molding resin that fills in the circuit molding section 12 may cover even the outer surface of a protective circuit module, while allowing external input and output terminals 16 and 17 to be exposed outside. The circuit molding section 12 can be formed to extend from every side of the bare cell 10 to a predetermined height. Also, a lower cover 20 made of an insulating material, such as a polymer, is connected to the bottom of the bare cell 10. The lower cover 20 is in a box shape with an opened top into which the bare cell 10 can be inserted, with its lower part being in close contact with every inner surface of the lower cover 20. If needed, a separate upper cover 25 can be provided to protect the circuit molding section 12. Certain conventional secondary batteries include no protective circuit module on top of the bare cell 10. Such batteries may provide only the upper cover 25 on top of the bare cell 10, without forming the circuit molding section 12.

As explained above, the exterior can of the bare cell 10 is made of a metal, such as aluminum, and connected to a positive electrode of an electrode assembly provided in the cell 10. The lower cover not only protects but also insulates the bottom of the can.

The bare cell 10 with the lower cover 20 connected is wrapped with a vinyl or polymer film which protects the outer surface of the bare cell 10, serves as a label for entering product information, and electrically insulates the cell 10 from outside.

Due to the tendency to manufacture electronic products in compact sizes, there is a growing demand for smaller and thinner secondary batteries that can be inserted in the compact electronic products. Generally, secondary batteries have a thickness of about 4.7 mm. However, a significant problem experienced by conventional secondary batteries is that they may swell to have a thicker center while being used.

Another problem is that the label overlap increases the thickness of the battery.

For example, as shown in FIG. 2a, the bare cell 10 with the lower cover 20 is wrapped with a label 30 in form of a film. Two opposing ends of the label 30 overlap and are adhered to each other on one side of the bare cell 10, thereby forming a label overlap portion 32. The secondary battery is thicker at the label overlap portion 32 on the lower cover 20 by a thickness of the label 30 (generally about 0.05 mm) than any other portion. The label overlap portion 32 increases the overall thickness of the secondary battery. If the circuit molding section 12 is also wrapped with the label 30, the secondary battery will also be thicker at the label overlap portion 32 on the circuit molding section 12 as shown in FIG. 2b.

SUMMARY OF THE INVENTION

Accordingly, the present invention has been made to solve one or more of the above-mentioned problems occurring in the prior art, and the claimed invention is directed to providing a can type lithium ion secondary battery having substantially a structure which enables the battery to have a uniform thickness that is thinner than a conventional battery thickness.

In order to accomplish this can type lithium ion secondary battery is provided that includes: a bare cell, a cover assembled with a top or bottom of the bare cell, and a label wrapped around the bare cell. Unlike conventional covers, however, the claimed cover has a label overlap receiving portion cut with a predetermined width at a predetermined position so as to receive a label overlap portion formed to adhere the label.

Illustratively, the label overlap receiving section can be provided on a wide sidewall of the cover. Alternatively, the label overlap receiving section can be provided on a wide sidewall of the cover, being cut from an edge of the wide sidewall. Additionally, the label overlap receiving section can be provided on a narrow sidewall of the cover, or can be provided on a narrow sidewall of the cover, being cut from an edge of the narrow sidewall.

BRIEF DESCRIPTION OF THE DRAWINGS

The above and other features and advantages of the claimed invention will be more apparent from the following detailed description taken in conjunction with the accompanying drawings.

FIG. 3b is a bottom view of the lower cover in FIG. 3a.

FIG. 5b is a bottom view of the lower cover in FIG. 5a.

FIG. 6b is a bottom view of the lower cover in FIG. 6a.

FIG. 7b is a front view of the can type lithium ion secondary battery in FIG. 7a.

FIG. 9b is a front view of the can type lithium ion secondary battery in FIG. 9a.

DETAILED DESCRIPTION OF THE PREFERRED EMBODIMENTS

Figure 1:
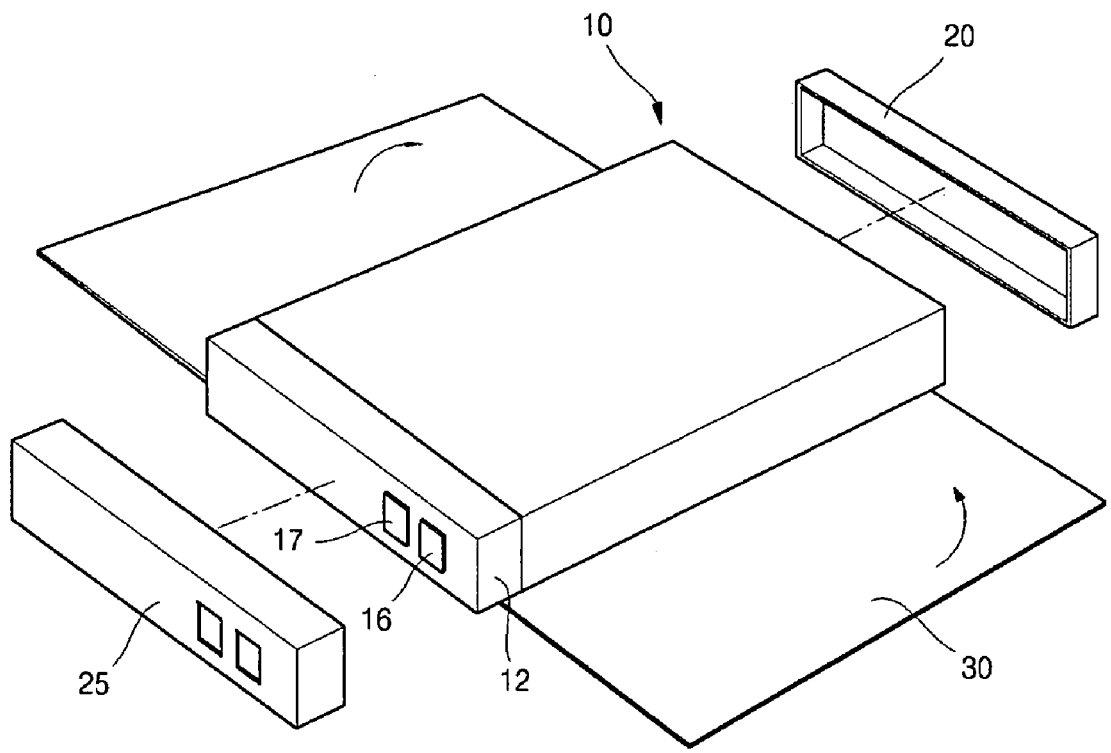
FIG. 1 is a perspective view showing the assembly of a lower cover into a conventional can type lithium ion secondary battery.
Figure 2A:
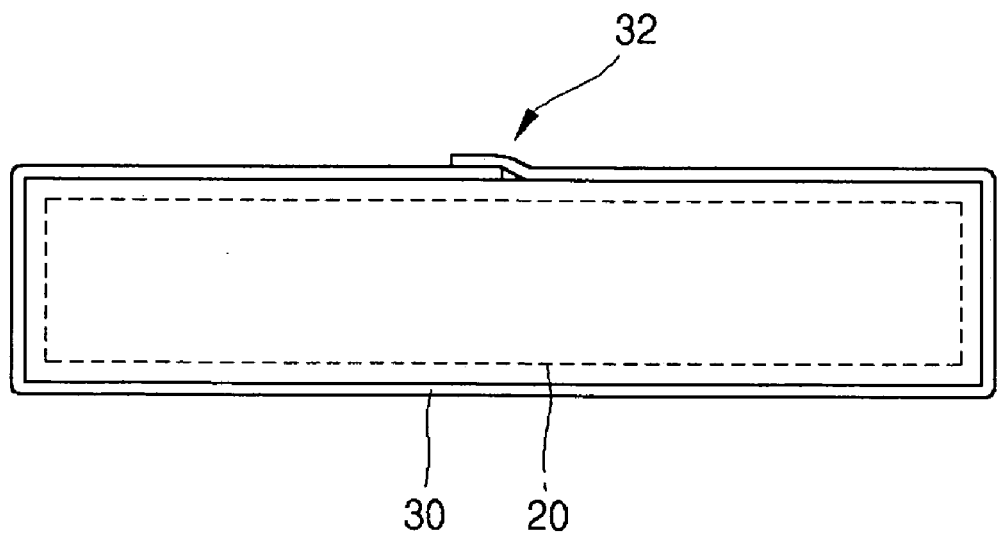
FIG. 2a is a bottom view of the prior art can type lithium ion secondary battery in FIG. 1 with a label wrapped thereon.
Figure 2B:
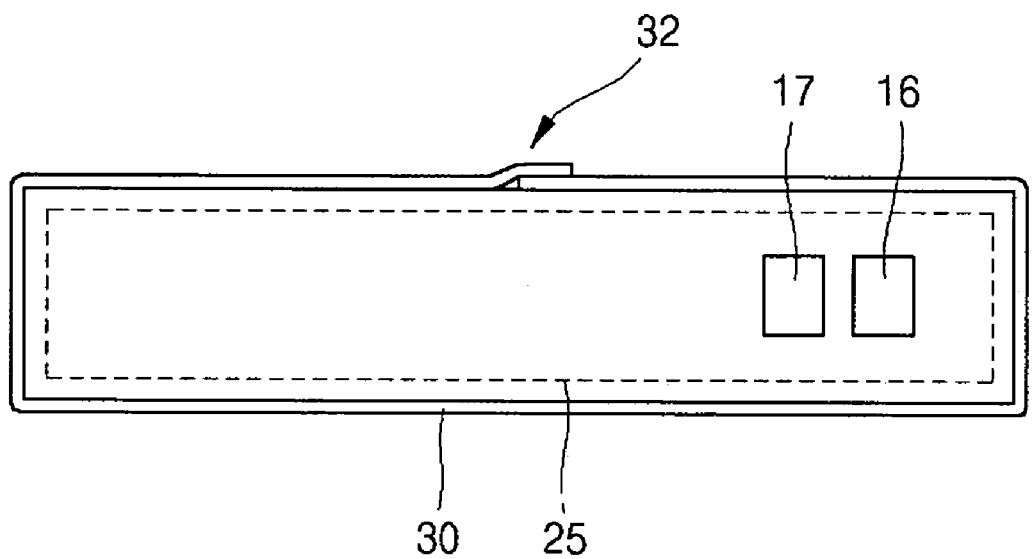
FIG. 2b is a plan view of the prior art can type lithium ion secondary battery in FIG. 1 with a label wrapped thereon.

Hereinafter, embodiments of the present invention will be described with reference to the accompanying drawings. Although a can type lithium ion secondary battery with a lower cover is explained below, the present invention is equally applicable to a battery with an upper cover.

Referring to FIGS. 3a, 3b, 3c, 4a, 4b, 5a, 5b, 6a, 6b, and 7a, the secondary battery of the claimed invention illustratively includes a bare cell 10, a circuit molding section 12, a lower cover 40 and a label 30. The bare cell 10 includes an electrode assembly and an exterior can. The circuit molding section 12 includes a protective circuit module (not shown) and a Positive Temperature Coefficient (PTC) device (not shown) which are connected in series by an electric terminal and enclosed by a molding resin. The lower cover 40 is connected to the bottom of the bare cell 10. The label 30 is wrapped on the external surface of the bare cell 10. Since two opposing ends of the label 30 overlap and are adhered to each other in order to wrap around the bare cell 10, a label overlap portion 32 is formed on a certain side of the bare cell 10. The label overlap portion 32 should be formed in an adequate width to prevent separation of the two adhered ends of the label 30 during the use of the secondary battery.

Figure 3A:
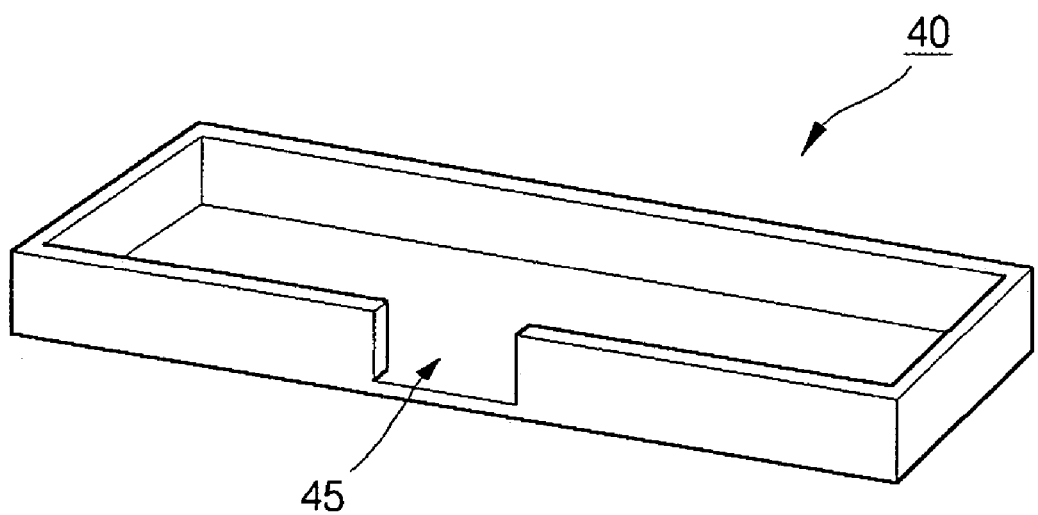
FIG. 3a is a perspective view of a lower cover according to a first embodiment of the present invention.
Figure 3B:
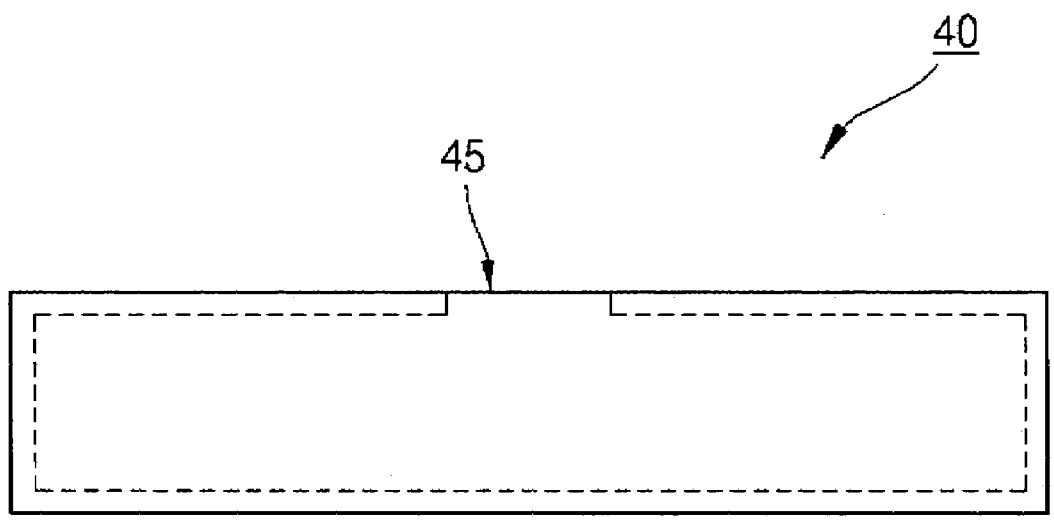

Referring to FIGS. 3a and 3b, the lower cover 40 that characterizes the present invention is made of an insulating material, such as resin. The lower cover 40 has a box shape with an opened top. The size of the lower cover 40 is determined according to the size of the bare cell 10. The lower cover 40 should have a size that makes the lower part of the bare cell 10 completely fit into the lower cover 40 and tightly contact the inner surfaces of the lower cover 40. The size of the lower cover 40 varies depending on the size of the bare cell 10.

The lower cover 40 has a label overlap receiving section 45 for receiving the label overlap portion 32 formed when the label 30 is wrapped on the bare cell 10. The label overlap receiving section 45 is formed at a predetermined width on a wider one of the four sidewalls of the lower cover 40 (hereinafter referred to as a "wide sidewall"). In one embodiment, the label overlap receiving section 45 is formed at a predetermined width on a wide sidewall of the lower cover 40, without cutting off the bottom of the lower cover 40 that is adjacent to the wide sidewall. In other words, the label overlap receiving section 45 is cut from the top of the wide sidewall of the lower cover 40 to the upper surface of the bottom adjacent to the wide sidewall so that it cannot be seen in a view from the bottom of the lower cover 40.

The label overlap portion 32 in an appropriate width is needed to tightly wrap the label 30 on the bare cell 10. Accordingly, the label overlap portion 32 should have a width sufficient to prevent separation of the two adhered ends of the label 30 during the use of the secondary battery. The width of the label overlap receiving section 45 is determined according to the width of the label overlap portion 32 to receive the label overlap portion 32 completely. When the width of the label overlap receiving section 45 is too narrow to receive the label overlap portion 32 as a whole, the advantageous effects of the present invention cannot be produced. When the label overlap receiving section 45 has an excessively broad width, the secondary battery cannot have a uniform thickness because label portions adjacent to the label overlap portion 32 are also received in the label overlap receiving section 45. Therefore, the label overlap receiving section 45 should be formed in an appropriate width in consideration of the width of the label overlap portion 32 formed to wrap the cell with the label 30.

Figure 3C:
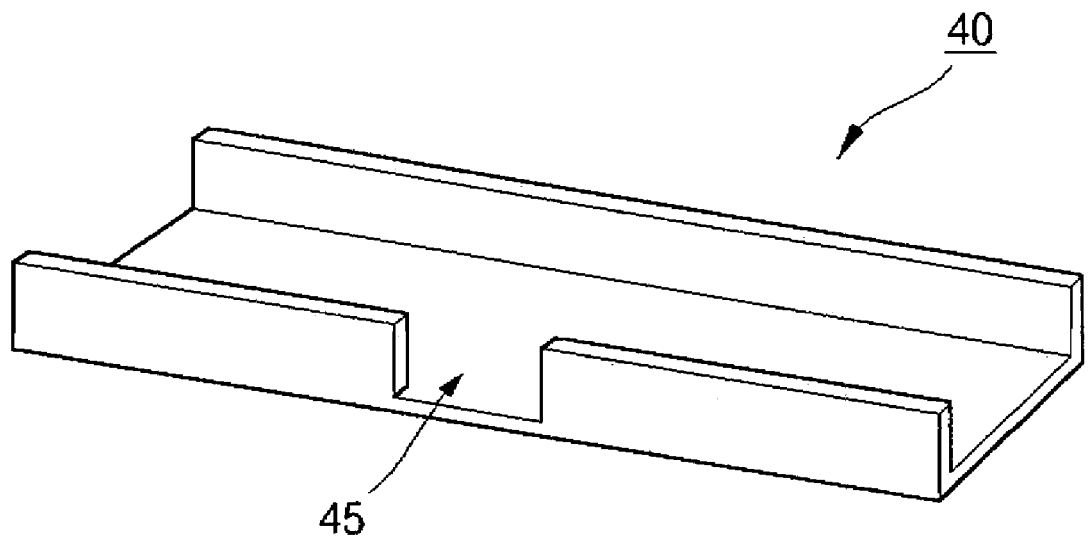
FIG. 3c is a perspective view of the lower cover in FIG. 3a with two narrow sidewalls removed.

It is possible to form the lower cover 40 to have only two wide sidewalls and a bottom, thus removing two narrow sidewalls as shown in FIG. 3c. In such an embodiment, the label overlap receiving section 45 can be provided on a wide sidewall of the lower cover 40.

Figure 4A:
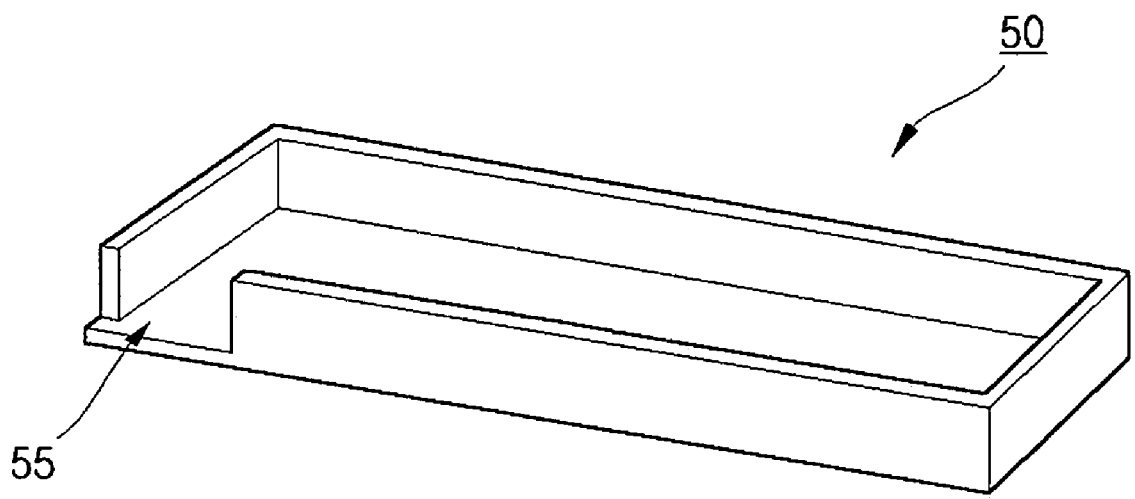
FIG. 4a is a perspective view of a lower cover according to a second embodiment of the present invention.
Figure 5A:
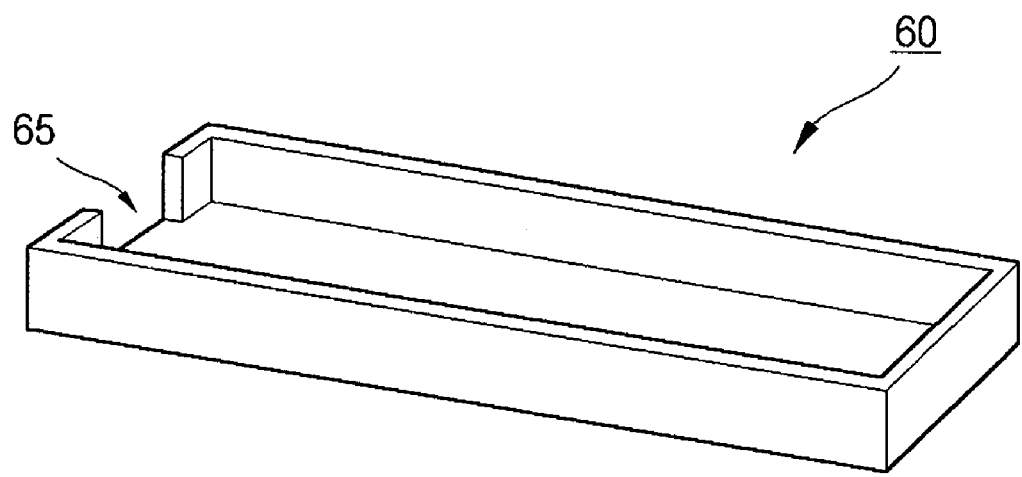
FIG. 5a is a perspective view of a lower cover according to a third embodiment of the present invention.

FIGS. 4a and 5a show another embodiment of the present invention, wherein the lower covers 50 and 60 have label overlap receiving sections 55 and 65 at different positions than the position shown in FIG. 3a. However the position of the label overlap receiving section 45 formed on the lower cover 40 is not limited, and may be placed at any desired location.

Figure 4B:
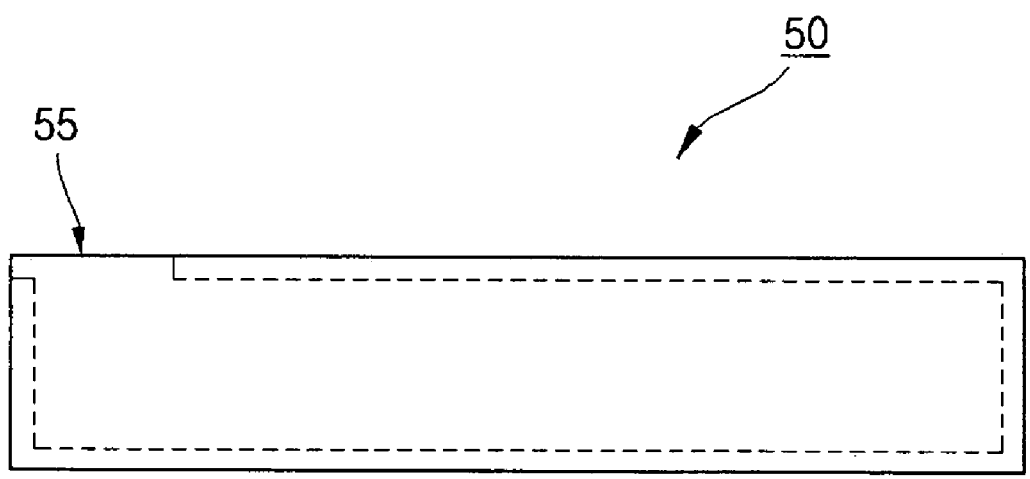
FIG. 4b is a bottom view of a can type lithium ion secondary battery with the lower cover in FIG. 4a wrapped with a label.

As shown in FIGS. 4a and 4b, the label overlap receiving section 55 may be formed on a wide sidewall of the lower cover 50, being cut from an edge of the wide sidewall. As explained above, the label overlap receiving section 55 has an adequate width according to the width of the label overlap portion 32. The lower cover 50 with the label overlap receiving section 55 bordering on an edge thereof as shown in FIG. 4a is used for the bare cell 10 wrapped to have the label overlap portion 32 at the corresponding edge position. Of course, even when bordering on an edge of the lower cover 50, the label overlap receiving section 55 may be cut from the top of the wide sidewall of the lower cover 50 to the lower surface of the adjacent bottom as shown in FIG. 6a.

Figure 5B:
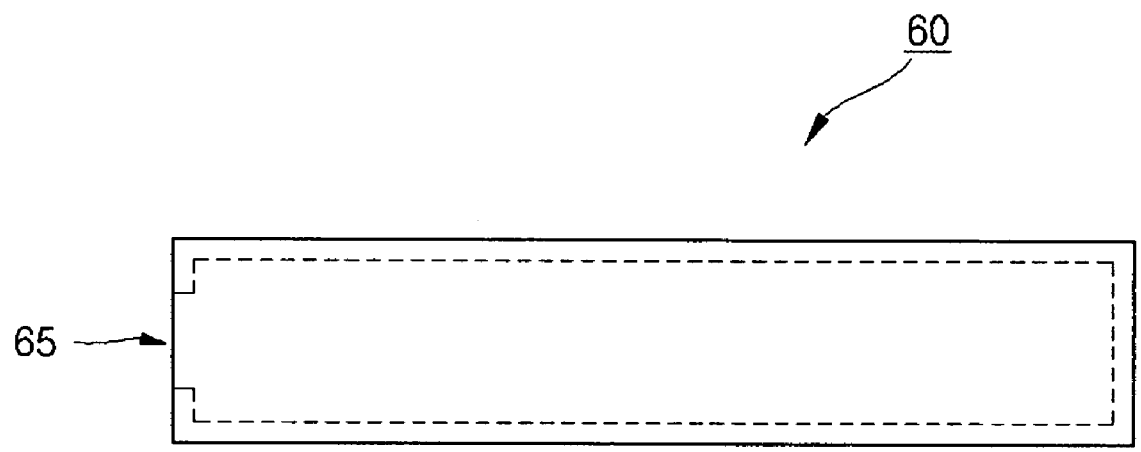

As shown in FIGS. 5a and 5b, the label overlap receiving section 65 may be formed on a narrow sidewall of the lower cover 60. As explained above, the label overlap receiving section 65 has an adequate width according to the width of the label overlap portion 32. The lower cover 60 having the label overlap receiving section 65 on a narrow sidewall thereof is used when the label 30 is wrapped to form the label overlap portion 32 at the corresponding narrow sidewall of the bare cell 10. Of course, the label overlap receiving section 65 may be cut from the top of the narrow sidewall of the lower cover 60 to the lower surface of the adjacent bottom as shown in FIG. 6a.

Figure 6A:
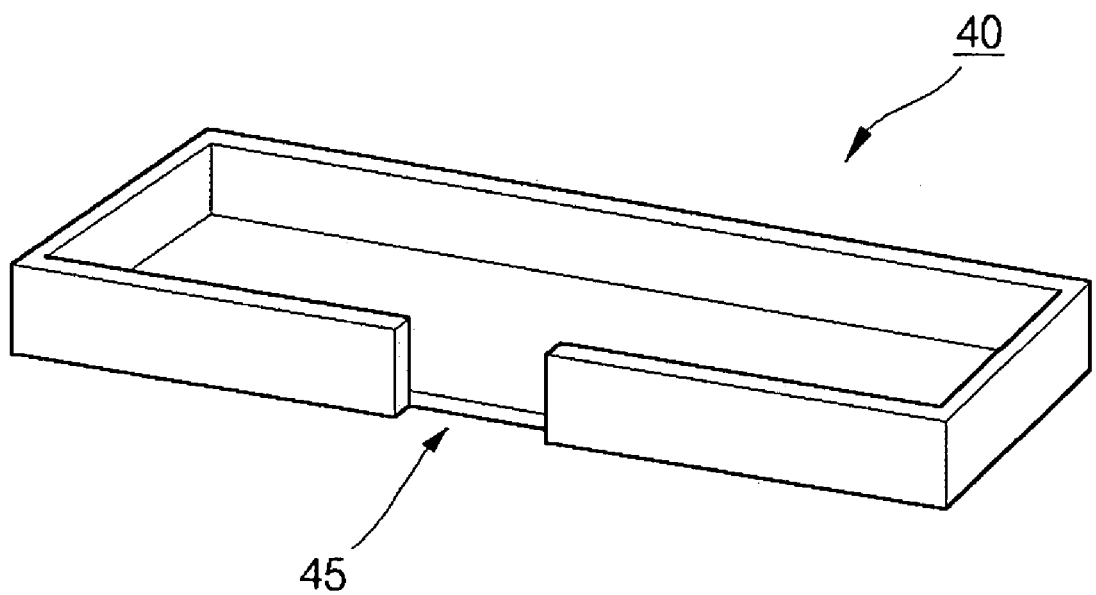
FIG. 6a is a perspective view of a lower cover according to a fourth embodiment of the present invention.
Figure 6B:
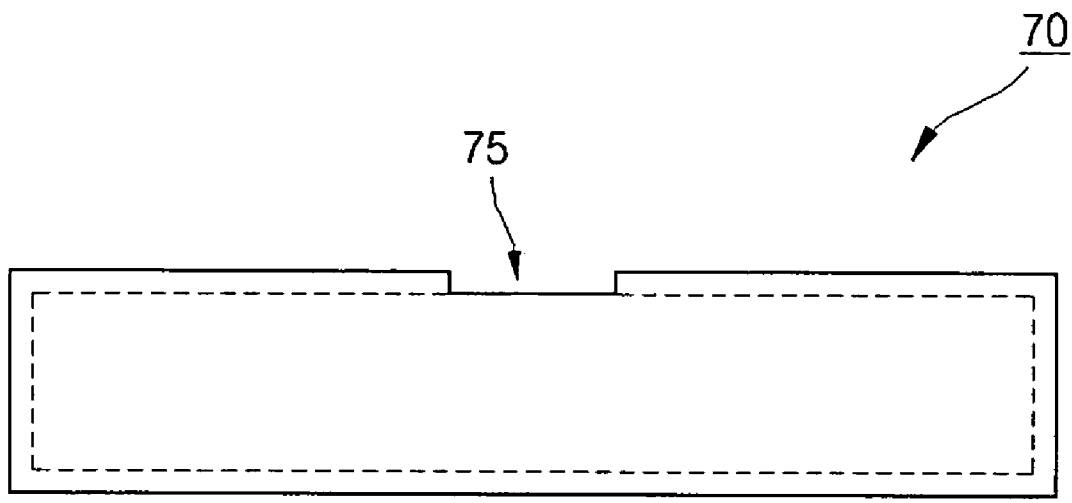

As shown in FIGS. 6a and 6b, the label overlap receiving section 45 or 75 may be formed on a sidewall of the lower cover 40 or 70, being cut from the top of the sidewall to the bottom adjacent to the sidewall. Forming the label overlap receiving section 45 as shown in FIG. 6a, is relatively easy compared to an overlap portion formed without cutting off the bottom adjacent to the sidewall. However, when the label overlap receiving section 45 is cut to the bottom of the lower cover, it is visible when viewing from the bottom of the secondary battery, which may deteriorate the appearance of the secondary battery.

Hereinafter, a secondary battery with a lower cover according to the present invention will be explained in detail.

Figure 7A:
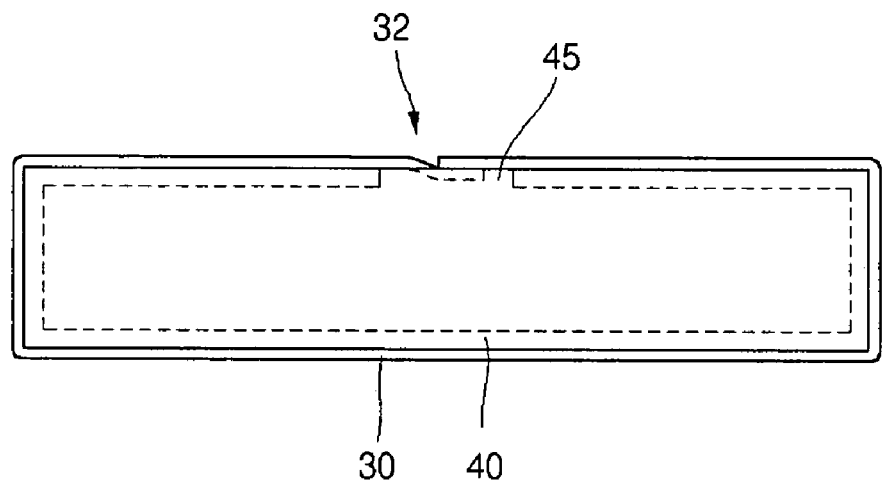
FIG. 7a is a bottom view of a can type lithium ion secondary battery with the lower cover in FIG. 3a wrapped with a label.
Figure 7B:
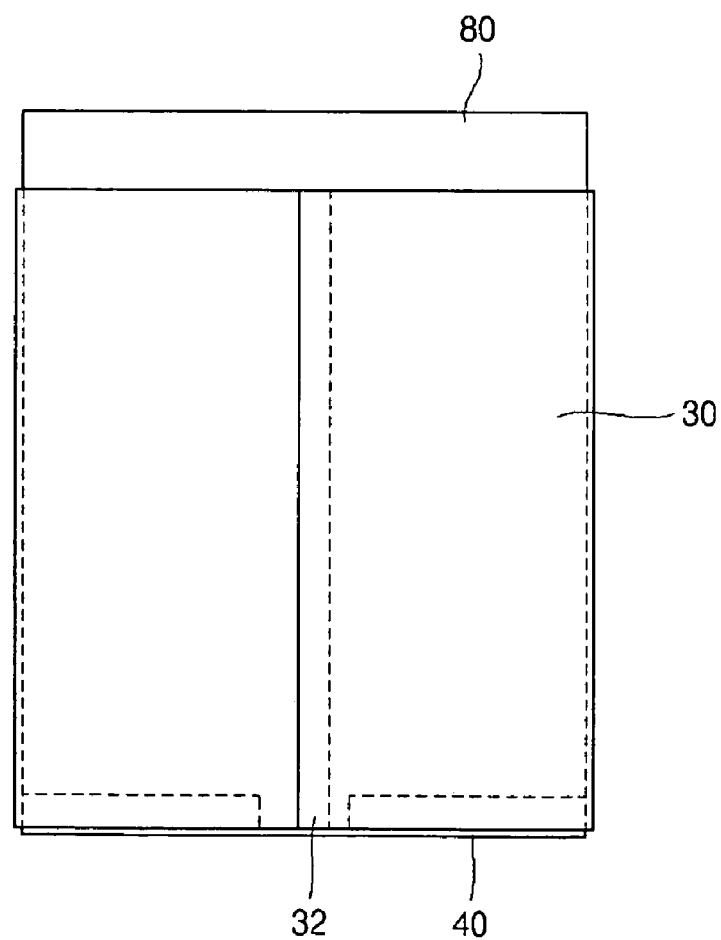

FIGS. 7a and 7b show a can type lithium ion secondary battery with the bare cell 10 and the lower cover 40 in FIG. 3a wrapped with the label 30. The label overlap portion 32 is formed at the position where the label overlap receiving section 45 is formed on the lower cover 40. As shown in FIG. 7a, the label overlap portion 32 is received in the label overlap receiving section 45 formed on the lower cover 40. Accordingly, the secondary battery maintains a substantially uniform thickness, without being thicker at the label overlap portion 32, as conventional batteries are.

Also, in this embodiment, since the label 30 has a length slightly shorter than that reaching the lower ends of the sidewalls of the lower cover 40 as shown in FIG. 7b, the label 30 on the label overlap portion 32 does not protrude beyond that on the other portion of the lower cover 40 when viewing from the bottom of the secondary battery.

Figure 8:
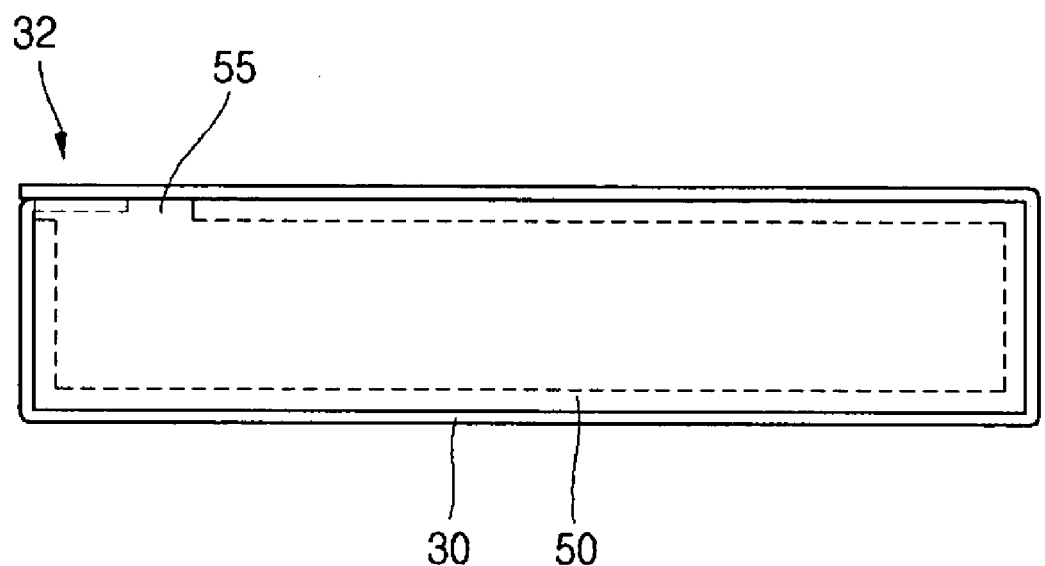
FIG. 8 is a bottom view of a can type lithium ion secondary battery with the lower cover in FIG. 4a wrapped with a label.

FIG. 8 shows the lower cover in FIG. 4a wrapped with the label 30. The label overlap receiving section 55 for receiving the label overlap portion 32 is formed at a position bordering on an edge of the lower cover 50. The label 30 may be evenly wrapped on the lower cover 40, without getting thicker at the label overlap portion 32.

The label overlap receiving portion can be cut to the bottom of the lower cover as shown in FIG. 6a. In such a case, the label overlap portion is visible when viewing from the bottom of the secondary battery. However, the label 30 looks evenly wrapped, without getting thicker at the label overlap portion 32.

Hereinafter, a secondary battery having a lower cover and a circuit molding section with a label overlap receiving section according to the present invention will be explained in detail.

Figure 9A:
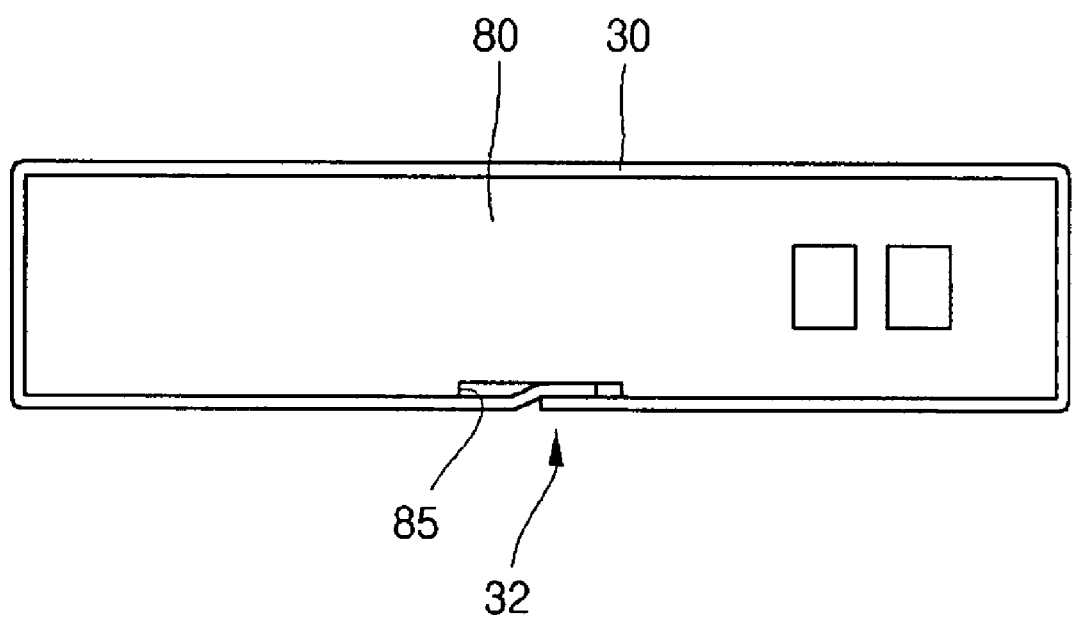
FIG. 9a is a plan view of a can type lithium ion secondary battery having a molding section wrapped with a label.
Figure 9B:
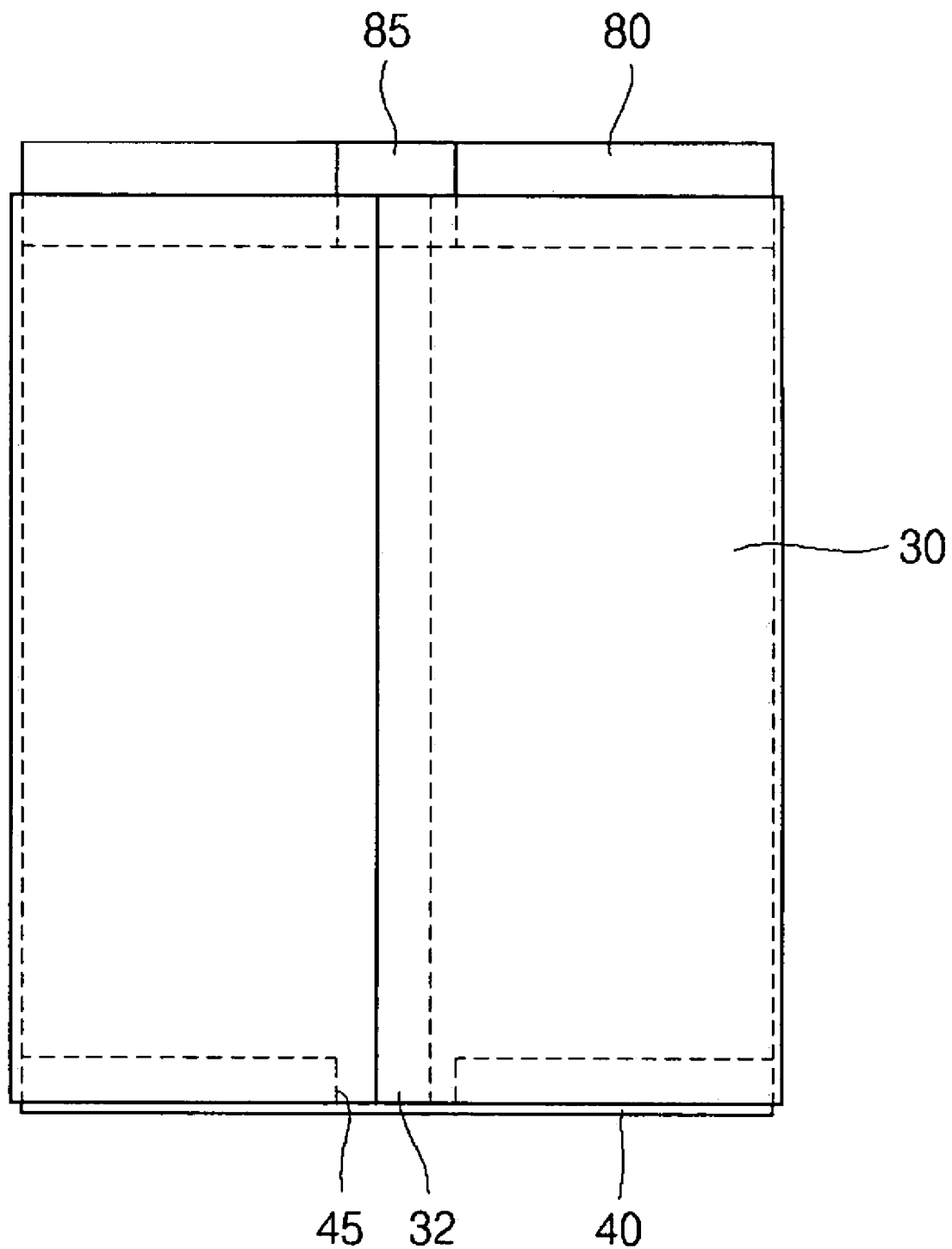

Referring to FIGS. 9a and 9b, when the label 30 is wrapped on the secondary battery from the circuit molding section 80 to the lower cover 40, a label overlap receiving groove 85 is formed on the circuit molding section 80 at a position collinear to the label overlap receiving section 45 formed on the lower cover 40. More specifically, the label overlap receiving groove 85 is cut at a predetermined width and a predetermined depth on one side of the circuit molding section 80. Illustratively, the label overlap receiving groove 85 is formed in the same width as and at a position collinear to the label overlap receiving section 45 of the lower cover 40. Like the label overlap receiving section 45, the label overlap receiving groove 85 can be formed at various positions of the circuit molding section 80. Accordingly, detailed explanations of the possible positions of the label overlap receiving groove 80 will be omitted.

In one embodiment, when the label 30 is wrapped around the secondary battery including the circuit molding section 80, the label overlap portion 32 is received in the label overlap receiving groove 85 on the circuit molding section 80. Like the label overlap receiving section 45 of the lower cover 40, the label overlap receiving groove 85 prevents the label 30 from being thicker at the label overlap portion 32. In this manner, it is possible to prevent the increase of the thickness of the secondary battery due to the label overlap portion 32.

According to the present invention, the label wrapped on the bare cell is not thicker at the label overlap portion on the lower cover. As a result, the secondary battery maintains a substantially uniform thickness.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A can type lithium ion secondary battery, comprising:
   a bare cell;
   a bare cell cover with a receiving portion cut; and
   a label wrapped around the cover, the label comprising an overlap portion in which a first end of the label overlaps and adheres to a second end of the label,
   wherein the receiving portion cut receives the overlap portion, and
   wherein an overall thickness of the bare cell and the bare cell cover at the overlap portion does not exceed the overall thickness of the bare cell and the bare cell cover at a portion adjacent to, but not part of, the overlap portion.

2. The can type lithium ion secondary battery of claim 1, wherein the receiving portion cut is formed on a wide sidewall of the bare cell cover.

3. The can type lithium ion secondary battery of claim 2, wherein the receiving portion cut is formed on a wide sidewall of the bare cell cover, being cut from an edge of the wide sidewall.

4. The can type lithium ion secondary battery of claim 1, wherein the receiving portion cut is formed on a narrow sidewall of the bare cell cover.

5. The can type lithium ion secondary battery of claim 4, wherein the receiving portion cut is formed on a narrow sidewall of the bare cell cover, being cut from an edge of the narrow sidewall.

6. The can type lithium ion secondary battery as claimed in claim 2, wherein the receiving portion cut is formed on a wide sidewall of the bare cell cover, being cut from the top of the sidewall of the bare cell cover to the upper surface of the bottom of the bare cell cover.

7. The can type lithium ion secondary battery as claimed in claim 3, wherein the receiving portion cut is formed on a wide sidewall of the bare cell cover, being cut from the top of the sidewall of the bare cell cover to the upper surface of the bottom of the bare cell cover.

8. The can type lithium ion secondary battery as claimed in claim 4, wherein the receiving portion cut is formed on a narrow sidewall of the bare cell cover, being cut from the top of the sidewall of the bare cell cover to the upper surface of the bottom of the bare cell cover.

9. The can type lithium ion secondary battery as claimed in claim 5, wherein the receiving portion cut is formed on a narrow sidewall of the bare cell cover, being cut from the top of the sidewall of the bare cell cover to the upper surface of the bottom of the bare cell cover.

10. The can type lithium ion secondary battery as claimed in claim 2, wherein the receiving portion cut is formed on a wide sidewall of the bare cell cover, being cut from the top of the sidewall of the bare cell cover to the lower surface of the bottom of the bare cell cover.

11. The can type lithium ion secondary battery as claimed in claim 3, wherein the receiving portion cut is formed on a wide sidewall of the bare cell cover, being cut from the top of the sidewall of the bare cell cover to the lower surface of the bottom of the bare cell cover.

12. The can type lithium ion secondary battery as claimed in claim 4, wherein the receiving portion cut is formed on a narrow sidewall of the bare cell cover, being cut from the top of the sidewall of the bare cell cover to the lower surface of the bottom of the bare cell cover.

13. The can type lithium ion secondary battery as claimed in claim 5, wherein the receiving portion cut is formed on a narrow sidewall of the bare cell cover, being cut from the top of the sidewall of the bare cell cover to the lower surface of the bottom of the bare cell cover.

14. The can type lithium ion secondary battery of claim 1, further comprising a protective circuit module connected to the top of the bare cell.

15. The can type lithium ion secondary battery of claim 14, wherein the protective circuit module is molded within a circuit molding section formed from resin.

16. The can type lithium ion secondary battery of claim 15, wherein the circuit molding section has a label overlap receiving portion cut at a predetermined width at a position collinear to the label overlap receiving portion formed on the bare cell cover.

17. A can type lithium ion secondary battery, comprising:
a bare cell;
a bare cell cover with a receiving portion cut;
a protective circuit module connected to the top of the bare cell; and
a label wrapped around the cover,
wherein the receiving portion cut receives a label overlap portion formed to adhere the label, wherein the protective circuit module is molded within a circuit molding section formed from resin, and wherein the circuit molding section has a label overlap receiving portion cut at a predetermined width at a position collinear to the label overlap receiving portion formed on the bare cell cover.

* * * * *

UNITED STATES PATENT AND TRADEMARK OFFICE
CERTIFICATE OF CORRECTION

PATENT NO. : 7,604,902 B2  Page 1 of 1
APPLICATION NO. : 11/091402
DATED : October 20, 2009
INVENTOR(S) : Heui Sang Yoon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 399 days.

Signed and Sealed this

Fifth Day of October, 2010

David J. Kappos
*Director of the United States Patent and Trademark Office*